United States Patent
Wang et al.

(10) Patent No.: US 12,216,655 B2
(45) Date of Patent: Feb. 4, 2025

(54) DATA ASSOCIATION QUERY METHOD AND APPARATUS, DEVICE, AND STORAGE MEDIUM

(71) Applicant: ZTE CORPORATION, Shenzhen (CN)

(72) Inventors: Taibao Wang, Shenzhen (CN); Donghui Xu, Shenzhen (CN); Yaofeng Tu, Shenzhen (CN); Qiang Zhang, Shenzhen (CN); Dezheng Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/012,903

(22) PCT Filed: Jun. 21, 2021

(86) PCT No.: PCT/CN2021/101362
§ 371 (c)(1),
(2) Date: Dec. 23, 2022

(87) PCT Pub. No.: WO2021/259217
PCT Pub. Date: Dec. 30, 2021

(65) Prior Publication Data
US 2023/0259509 A1   Aug. 17, 2023

(30) Foreign Application Priority Data
Jun. 23, 2020   (CN) .......................... 202010583764.3

(51) Int. Cl.
*G06F 16/2453* (2019.01)

(52) U.S. Cl.
CPC .............................. *G06F 16/24542* (2019.01)

(58) Field of Classification Search
CPC .................................................. G06F 16/24542
See application file for complete search history.

(56) References Cited

U.S. PATENT DOCUMENTS

2006/0100989 A1* 5/2006 Chinchwadkar ...... G06F 16/835
2007/0156677 A1   7/2007 Szabo
(Continued)

FOREIGN PATENT DOCUMENTS

| CN | 106227892 A | 12/2016 |
| CN | 107122443 A | 9/2017 |

(Continued)

OTHER PUBLICATIONS

International Search Report in Application No. PCT/CN2021/101362 dated Sep. 24, 2021, 4 pages including translation.
(Continued)

*Primary Examiner* — Van H Oberly
(74) *Attorney, Agent, or Firm* — Morgan, Lewis & Bockius LLP (57) ABSTRACT

Provided are a data association query method and apparatus, a device, and a storage medium. The data association query method includes the following: parsing a data query statement to obtain association query information, where the association query information includes query key information of a first association table; determining a query policy according to the query key information, where the query policy includes a partition filtering policy, a scan-while-filter policy and a scan-before-filter policy; and querying data in a second association table based on the query policy.

15 Claims, 2 Drawing Sheets

(56) References Cited

U.S. PATENT DOCUMENTS

| | | | |
|---|---|---|---|
| 2013/0198232 A1* | 8/2013 | Shamgunov | G06F 16/2471 707/770 |
| 2014/0214796 A1 | 7/2014 | Barber et al. | |
| 2018/0218045 A1* | 8/2018 | Pal | G06F 16/24532 |
| 2020/0019381 A1* | 1/2020 | Patel | G06F 8/71 |

FOREIGN PATENT DOCUMENTS

| | | |
|---|---|---|
| CN | 107688581 A | 2/2018 |
| CN | 110019296 A | 7/2019 |

OTHER PUBLICATIONS

Extended European Search Report in Application No. 21828274.7, dated Jun. 24, 2024, 7 pages.

Anonymous: "Join (SQL)—Wikipedia", May 25, 2020, pp. 1-14, XP093171802, Retrieved from the Internet: URL:https://en.wikipedia.org/w/index.php?title=Join_(SQL)&oldid=958688961.

Anonymous: "CUBRID—Wikipedia", Jun. 22, 2020, pp. 1-10, XP093173767, Retrieved from the Internet: URL:https://en.wikipedia.org/w/index.php?title=CUBRID&oldid=963845272.

* cited by examiner

DATA ASSOCIATION QUERY METHOD AND APPARATUS, DEVICE, AND STORAGE MEDIUM

CROSS REFERENCE TO RELATED APPLICATIONS

This is a National Stage Application filed under 35 U.S.C. 371, based on International Patent Application No. PCT/CN2021/101362 filed on Jun. 21, 2021, which claims priority to Chinese Patent Application No. 202010583764.3 filed with the China National Intellectual Property Administration (CNIPA) on Jun. 23, 2020, the disclosures of which are incorporated herein by reference in their entireties.

TECHNICAL FIELD

Embodiments of the present application relate to the field of data query technologies, and in particular, a data association query method and apparatus, a device, and a storage medium.

BACKGROUND

A data query is a common operation in big data processing, and the underlying engine called by the data query is a distributed data processing engine. In common database models, tables are generally divided into fact tables and dimension tables. The fact tables record actual data information, and the amount of data increases over time. The dimension tables are generally fixed and record basic information of transactions. The association query is a query operation for two or more tables.

In the related art, the association query of data consumes resources and time.

SUMMARY

Embodiments of the present application provide a data association query method and apparatus, a device, and a storage medium which can reduce the amount of data processed during an association query and improve the efficiency of the association query.

An embodiment of the present application provides a data association query method. The data association query method includes the following: a data query statement is parsed to obtain association query information, where the association query information includes query key information of a first association table; a query policy is determined according to the query key information; and data in a second association table is queried based on the query policy.

An embodiment of the present application provides a data association query apparatus. The data association query apparatus includes an association query information acquisition module, a query policy determination module, and a data query module, the association query information acquisition module is configured to parse a data query statement to obtain association query information, where the association query information includes query key information of a first association table; the query policy determination module is configured to determine a query policy according to the query key information; and the data query module is configured to query data in a second association table based on the query policy.

An embodiment of the present application provides a computer device. The computer device includes a memory, a processor, and a computer program stored on the memory and executable on the processor, where when executing the program, the processor performs the data association query method provided by the embodiments of the present application.

An embodiment of the present application provides a computer-readable storage medium. The computer-readable storage medium is configured to store a computer program, where the program, when executed by a processor, performs the data association query method provided by the embodiments of the present application.

DETAILED DESCRIPTION

To make the objects, schemes and advantages of the present application more apparent, a detailed description is given hereinafter to illustrate embodiments of the present application in conjunction with drawings. It is to be noted that if not in collision, the embodiments and features therein in the present application may be combined with one another.

It is to be understood that the embodiments described herein are intended to explain the present application and not to limit the present application.

Suffixes such as "module", "part" or "unit" used to indicate elements in the subsequent description are used to facilitate the description of the present application and have no particular meaning in themselves. Therefore, "module", "part" or "unit" may be used in a mixed manner.

Figure 1:
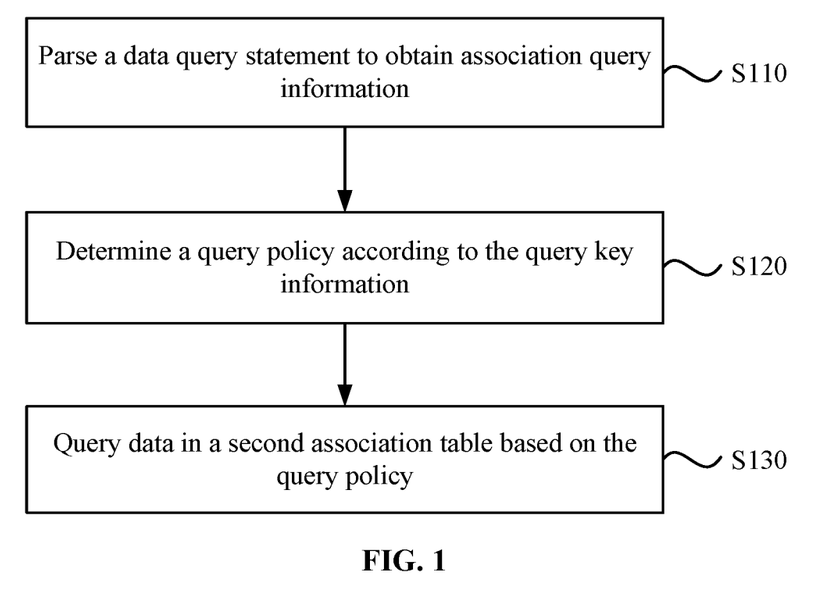
FIG. 1 is a flowchart of a data association query method according to an embodiment of the present application.

In an embodiment, FIG. 1 is a flowchart of a data association query method according to an embodiment of the present application. The method may be applied to the case of performing an association query on data. The method may be performed by a data association query apparatus. As shown in FIG. 1, the method includes S110 to S130.

In S110, a data query statement is parsed to obtain association query information.

Figure 2:
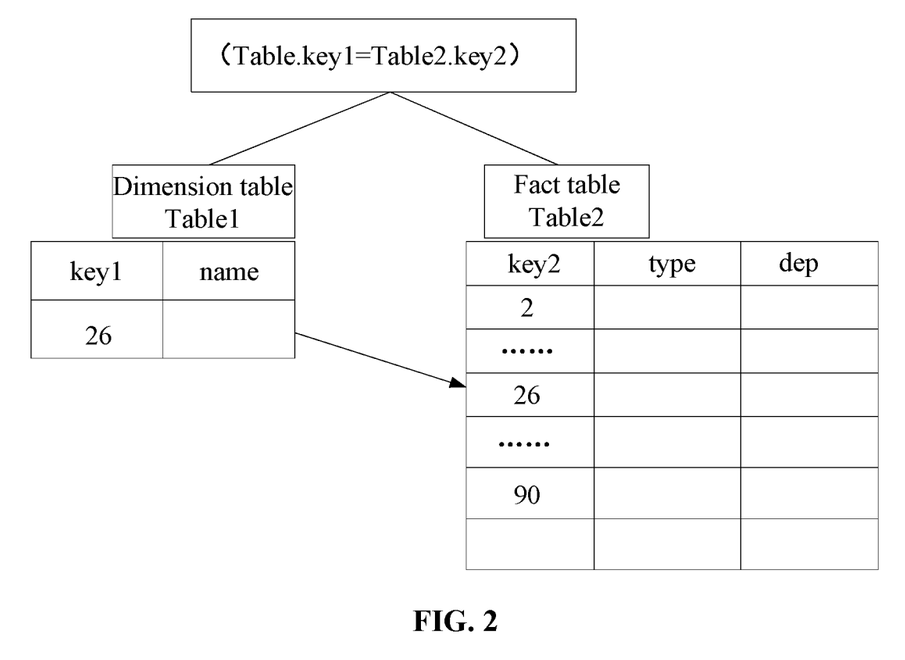
FIG. 2 is a schematic diagram of association tables according to an embodiment of the present application.

The association query information includes query key information of a first association table. The association query information further includes the first association table and at least one second association table having an association relationship with the first association table. In this embodiment, the first association table may be understood as a dimension table used for recording basic feature information of data, and the second association table may be understood as a fact table used for recording actual data. The query key information of the first association table is the same as the query key information of the second association table, and thus when the query key information of the first association table is obtained, the query key information of the second association table is also obtained. For example, FIG. 2 is a schematic diagram of association tables according to an embodiment of the present application. As shown in FIG. 2, a dimension table table1 and a fact table table2 are included. The dimension table table1 only records basic feature information of data, such as key values and names, and the fact table Table2 records actual data.

The data query statement may be structured query language (SQL).

In an embodiment, the data query statement may be parsed in the following manner to obtain the association query information: a logical plan is generated based on statement logic of the data query statement, an association query node in the logical plan is extracted, and association query information corresponding to the query node is acquired.

The data query statement is divided according to included statements to obtain multiple nodes, and a logical plan is generated based on the nodes obtained after statement division. An association query node satisfying an association query condition, such as an Equi-Join node, is extracted from the logical plan. Finally, the association query information corresponding to the association query node is acquired. For example, taking an SQL statement as an example: "select*from table1, table2 where table1.key1=table2.key2 and table1.key1=100", the association query information extracted from the above SQL statement is "table1.key1=table2.key2 and table1.key1=100", and the following may be obtained from the association query information: the first association table is table1, the second association table is table2, and the query key information is table1.key1=100, that is, data with the key value of 100 needs to be queried.

In S102, a query policy is determined according to the query key information.

The query policy may include a partition filtering policy, a scan-while-filter policy, and a scan-before-filter policy.

In an embodiment, the query policy may be determined according to the query key information in the following manner: a statement format of the query key information is determined, and the query policy is determined according to the statement format.

The statement format may include a partition column format and a non-partition column format. Partition column format may be understood as data being stored according to certain attributes in partitions and columns, for example, data is stored according to time in partitions and columns.

In an embodiment, if the statement format is the partition column format, the query policy is the partition filtering policy. If the statement format is the non-partition column format, a storage format of the data in the second association table is determined, and the query policy is determined according to the storage format.

The storage format may include a column-oriented storage format and a non-column-oriented storage format. If the storage format is the column-oriented storage format, the query policy is the scan-while-filter policy. If the storage format is a non-column-oriented storage format, the query policy is the scan-before-filter policy.

In this embodiment, the query policy is determined based on the query key information, and the mode of the data association query can be dynamically adjusted.

In S130, data in a second association table is queried based on the query policy.

In this embodiment, since the actual data is recorded in the second association table, the data needs to be queried in the second association table.

In an embodiment, when the query policy is the partition filtering policy, the data in the second association table may be queried based on the query policy in the following manner: partitions that do not match the query key information are filtered out from the second association table, and a data query is performed on partitions remaining after filtering according to the query key information. For example, assuming that the key query information is that table1.key1=100, partitions whose key value is not 100 are filtered out from the second association table, partitions whose key value is 100 are reserved, and the data query is performed in the reserved partitions according to the key query information.

In an embodiment, if the key query information includes only partition key values, data in the reserved partitions is target data. If the key query information also includes relevant statistical information (such as min/max, etc.), the data in the reserved partitions is continuously scanned to obtain target data according to the relevant statistical information.

In an embodiment, if the query policy is the scan-while-filter policy, the process where the data in the second association table is queried based on the query policy may be the following: column-oriented data in the second association table is scanned sequentially, and in response to scanning data of the current column, a key value of the current column is matched with the query key information; if the matching successes, data of the current column is determined as target data; and if the matching fails, the current column is skipped, and the next column is scanned until the target data is scanned. The data in the second association table is scanned while being filtered, thereby reducing the scanning amount of data and further improving the efficiency of the association query.

In an embodiment, if the query policy is the scan-before-filter policy, the data in the second association table may be queried based on the query policy in the following manner: all data in the second association table is scanned to obtain a key value of data, and data whose key value does not match the query key information is filtered out to obtain target data. The advantage of the preceding manner is that the amount of data that continues to participate in the subsequent association query can be reduced.

In the technical scheme of embodiments of the present application, a data query statement is parsed to obtain association query information, where the association query information includes the query key information of a first association table; a query policy is determined according to the query key information; and data in a second association table is queried based on the query policy. In the data association query method provided by the embodiments of the present application, the query policy is dynamically determined according to the query key information, and the data source is filtered based on the query policy when data is queried, since not all data in the data source is scanned, thereby reducing the amount of data processed during an association query and improving the efficiency of the association query.

In addition, with the wide application of big data in actual production, the processing assemblies related to big data are emerging one after another. For example, Apache Spark is a unified analysis engine for large-scale data processing at present. Compared with the classic MapReduce distributed processing in Apache Hadoop, Spark has the following advantages: compared with tedious codes of MapReduce, codes of the distributed processing in Spark are relatively simple; MapReduce can only support map and reduce methods and is tedious in the development of operations such as join and group by, while Spark supports different scenarios such as multi-iteration operations and interactive learning. With various analysis engine assemblies related to big data, such as Spark, Flink, Hive, Impala, etc., since the execution procedure of the underlying SQL engine is the same when a data association query operation is performed, in the embodiments of the present application, the related scenarios where the association query operation may be performed for the big data SQL engine do not lose generality.

In an embodiment, it is assumed that an SQL association query statement submitted by a user is: select t,p from table1 join table2 on table1.key1=table2.key2. An association query is performed on the first association table table1 and the second association table table2, and association fields, that is, the association query information, are key1 field of table1 and key2 field of table2. The association query procedure is as follows.

In step one, a logical plan is generated based on the statement logic of the data query statement, that is, the SQL engine first generates the logical plan for an SQL statement; an association query node in the logical plan is extracted, that is, an Equi-Join node satisfying the condition is found; and finally the association query information corresponding to the query node is obtained, where the association query information includes the query key information of the first association table, that is, association field information of the first association table table1 in an association Join operation is obtained. The association field information is the query key information.

In step two, a statement format of the query key information is determined.

The operations are as follows: new filter node information, that is, the association field information of the first association table table1, which is in the form of Filter(seq (table1.key1),table2.key2), is inserted on the side of the second association table table2. A data filtering operation is performed on table2 using key1 information. Since the first association table table1 and the second association table table2 may have multiple association fields, seq is used for storing the association field information to achieve the purpose of filtering some data in the second association table according to the inserted filter node information. It is determined whether the association field information key2 of the second association table table2 is in the partition column format. In this embodiment, the association field information key2 of the second association table is the same as the association field key1 of the first association table.

In step three, if the statement format is the partition column format, the query policy is the partition filtering policy. That is, if the association field information key2 of the second association table table2 is in the partition column format, all data in the association field information key1 of table1 needs to be collected. When data of key1 is collected, an SQL, select key1 from table1 group by key1, needs to be executed, and then collected data is put into one Seq.

In step four, partitions that do not match the query key information are filtered out from the second association table. That is, the query key information in the Seq is acquired, and partition filtering is performed according to the query key information.

In step five, a data query is performed in partitions after filtering according to the query key information. That is, the data query is performed in the partitions obtained after filtering.

In an embodiment, the partition filtering performed according to the association field can greatly reduce the scanning amount of data.

In an embodiment, it is assumed that the SQL association query statement submitted by the user is: select t,p from table1 join table2 on table1.key1=table2.key2. An association query is performed on the first association table table1 and the second association table table2, and the association fields, that is, the association query information, are key1 field of the first association table table1 and key2 field of table2. The association query procedure includes the following:

In step one, a logical plan is generated based on the statement logic of the data query statement, that is, an SQL engine first generates a logical plan for an SQL statement; an association query node in the logical plan is extracted, that is, an Equi-Join node that satisfies the condition is found; and finally the association query information corresponding to the query node is obtained. The association query information includes the query key information of the first association table, that is, the association field information of the first association table table1 in an association Join operation is obtained. The association field information is the query key information.

In step two, a statement format of the query key information is determined.

The operations are as follows: new filter node information, that is, the association field information of the first association table table1, which is in the form of Filter(seq (table1.key1),table2.key2), is inserted on the side of the second association table table2. A data filtering operation is performed on table2 using key1 information. Since the first association table table1 and the second association table table2 may have multiple association fields, an seq is used for storing the association field information to achieve the purpose of filtering some data in the second association table according to the inserted filter node information. It is determined whether the association field information key2 of the second association table table2 is in the partition column format. In this embodiment, the association field information key2 of the second association table is the same as the association field key1 of the first association table.

In step five, if the statement format is the non-partition column format, a storage format of the data in the second association table is acquired, and a query policy is determined according to the storage format.

If the association field information key2 of the second association table table2 is in the non-partition column format, min/max statistical information in the association field information key1 of the first association table table1 needs to be collected. When the statistical information of key1 is collected, an SQL, select min(key1)/max(key1) from table1, needs to be executed, and the collected data is put into one Seq. The storage format of the second association table table2 is acquired to determine the query policy according to the storage format.

In step six, if the storage format is the column-oriented storage format, the query policy is the scan-while-filter policy. That is, if an underlying file stored in the data of the second association table is in the column-oriented storage format, the data source is scanned and filtered according to relevant filtering information (min/max, etc.) in the Seq.

In step seven, if the storage format is the non-column-oriented storage format, the query policy is the scan-before-filter policy. That is, if an underlying file stored in the data of the second association table is not in the column-oriented storage format, a full table scan is performed on the data source of the second association table, and then the data source is filtered according to relevant filtering information (min/max, etc.) in the Seq.

In step eight, a result of the association query is returned.

Figure 3:
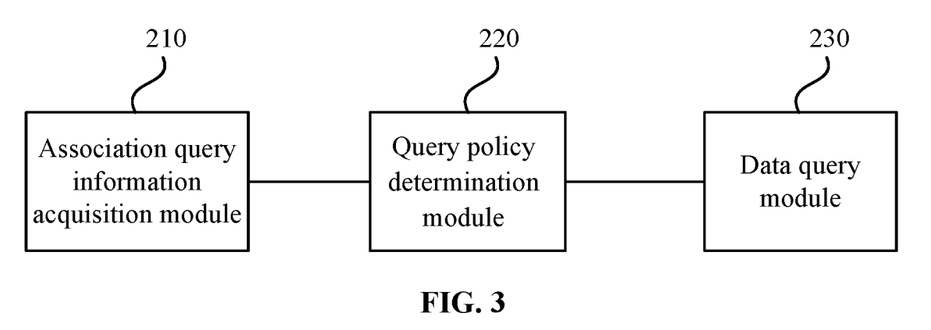
FIG. 3 is a structural diagram of a data association query apparatus according to an embodiment of the present application.

In an embodiment, FIG. 3 is a structural diagram of a data association query apparatus according to an embodiment of the present application. As shown in FIG. 3, the apparatus includes an association query information acquisition module 210, a query policy determination module 220, and a data query module 230.

The association query information acquisition module 210 is configured to parse a data query statement to obtain association query information, where the association query information includes query key information of a first association table.

The query policy determination module 220 is configured to determine a query policy according to the query key information, where the query policy includes a partition filtering policy, a scan-while-filter policy, and a scan-before-filter policy.

The data query module 230 is configured to query data in a second association table based on the query policy.

In an embodiment, the association query information acquisition module 210 is further configured to generate a logical plan based on statement logic of the data query statement, extract an association query node in the logical plan, and acquire association query information corresponding to the query node.

In an embodiment, the query policy determination module 220 is further configured to determine a statement format of the query key information and determine the query policy according to the statement format.

In an embodiment, the query policy determination module 220 is further configured to, in a case where the statement format is a partition column format, determine the query policy as the partition filtering policy.

In an embodiment, the data query module 230 is further configured to filter out partitions that do not match the query key information from the second association table and perform data query in partitions after filtering according to the query key information.

In an embodiment, the query policy determination module 220 is further configured to, in a case where the statement format is a non-partition column format, determine a storage format of the data in the second association table and determine the query policy according to the storage format.

In an embodiment, the query policy determination module 220 is further configured to, in a case where the storage format is a column-oriented storage format, determine the query policy as the scan-while-filter policy.

In an embodiment, the data query module 230 is further configured to scan column-oriented data in the second association table sequentially, and in response to scanning data of a current column, match a key value of the current column with the query key information; in a case where matching between the key value of the current column and the query key information successes, determine data of the current column as target data; and in a case where the matching between the key value of the current column and the query key information fails, skip the current column, and scan the next column until target data is scanned.

In an embodiment, the query policy determination module 220 is further configured to, in a case where the storage format is a non-column-oriented storage format, determine the query policy as the scan-before-filter policy.

In an embodiment, the data query module 230 is further configured to scan all data in the second association table to obtain a key value of the data and filter out data whose key value does not match the query key information to obtain target data.

Figure 4:
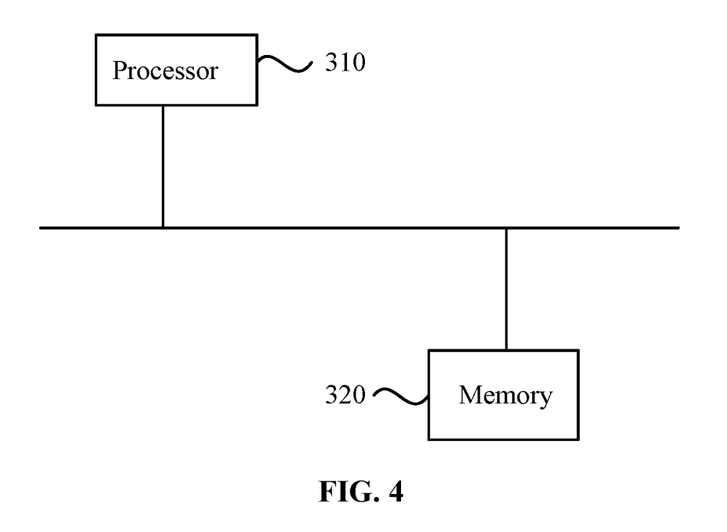
FIG. 4 is a structure diagram of a computer device according to an embodiment of the present application.

In an embodiment, FIG. 4 is a structure diagram of a computer device according to an embodiment of the present application. As shown in FIG. 4, the device provided by the present application includes a processor 310 and a memory 320. The number of processors 310 in the device may be one or more, and one processor 310 is shown as an example in FIG. 4. The number of memories 320 in the device may be one or more, and one memory 320 is shown as an example in FIG. 4. The processor 310 and the memory 320 in the device may be connected via a bus or in other manners, and the connection via a bus is shown as an example in FIG. 4. In an embodiment, the device is the computer device.

The memory 320, as a computer-readable storage medium, may be configured to store software programs and computer-executable programs and modules such as program instructions/modules (such as an association query information acquisition module 210, a query policy determination module 220, and a data query module 230 in the data association query apparatus) corresponding to the device in any embodiment of the present application. The memory 320 may include a program storage region and a data storage region. The program storage region may store an operating system and an application program required by at least one function. The data storage region may store data created according to the use of the device. In addition, the memory 320 may include a high-speed random-access memory, and may also include a non-volatile memory such as at least one disk memory, a flash memory or another non-volatile solid-state memory. In some examples, the memory 320 may include memories remotely disposed relative to the processor 310, and these remote memories may be connected to the device via a network. Examples of the preceding network include, but are not limited to, the Internet, an intranet, a local area network, a mobile communication network, and combinations thereof.

The device provided above may be configured to execute the data association query method provided by any embodiment described above and has corresponding functions and effects.

The programs stored in the memory 320 may be program instructions/modules corresponding to the data association query method provided by the embodiments of the present application. The processor 310 executes the software programs, instructions and modules stored in the memory 320 to perform one or more function applications and data processing of a computer device, that is, to implement the data association query method described in the above method embodiments. It is to be understood that when the preceding device is a receiving end, the device can execute the data association query method provided by any embodiment of the present application and has corresponding functions and effects.

The embodiments of the present application further provide a storage medium containing computer executable instructions, when executed by a computer, the computer executable instructions are configured to execute a data association query method, and the method includes the following: a data query statement is parsed to obtain association query information, where the association query information includes query key information of a first association table; a query policy is determined according to the query key information; and data in a second association table is queried based on the query policy.

It is to be understood by those skilled in the art that the term user equipment covers any suitable type of wireless user device, for example, a mobile phone, a portable data processing apparatus, a portable web browser or a vehicle-mounted mobile station.

Generally speaking, the various embodiments of the present application may be implemented in hardware or special-purpose circuits, software, logic or any combination thereof.

For example, some aspects may be implemented in hardware while other aspects may be implemented in firmware or software executable by a controller, a microprocessor or another calculation apparatus, though the present application is not limited thereto.

Embodiments of the present application may be implemented through the execution of computer program instructions by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored on the memory. The memory may be of any type suitable for a local technical environment and may be implemented using any suitable data storage technology, such as, but not limited to, a read-only memory (ROM), a random-access memory (RAM), and an optical memory apparatus and system (a digital video disc (DVD) or a compact disc (CD)). Computer-readable media may include non-transitory storage media. The data processor may be of any type suitable to the local technical environment which, such as but not limited to, a general-purpose computer, a special-purpose computer, a microprocessor, a digital signal processing (DSP), an application-specific integrated circuit (ASIC), a field-programmable gate array (FPGA), and a processor based on a multi-core processor architecture.

The preceding are example embodiments of the present application and are not intended to limit the scope of the present application.

Embodiments of the present application may be implemented through the execution of computer program instructions by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, state setting data, or source codes or object codes written in any combination of one or more programming languages.

The detailed description of example embodiments of the present application has been provided above through exemplary and non-restrictive examples. However, considering the drawings and the claims, various modifications and adjustments to the preceding embodiments are apparent to those skilled in the art without departing from the scope of the present application. Accordingly, the proper scope of the present application is determined according to the claims.

What is claimed is:

1. A data association query method, comprising:
   parsing a data query statement to obtain association query information; wherein the association query information comprises query key information of a first association table;
   determining a query policy according to the query key information; wherein the query policy comprises a partition filtering policy, a scan-while-filter policy and a scan-before-filter policy; and
   querying, based on the query policy, data in a second association table to obtain target data;
   wherein determining the query policy according to the query key information comprises:
   determining a statement format of the query key information; and
   determining the query policy according to the statement format;
   wherein determining the query policy according to the statement format comprises:
   in response to the statement format being a partition column format, determining the query policy as the partition filtering policy;
   accordingly, querying the data in the second association table based on the query policy of the first association table comprises:
   filtering out partitions that do not match the query key information from the second association table; and
   performing a data query in remaining partitions after filtering according to the query key information.

2. The data association query method of claim 1, wherein parsing the data query statement to obtain the association query information comprises:
   generating a logical plan based on statement logic of the data query statement;
   extracting an association query node in the logical plan; and
   acquiring association query information corresponding to the association query node.

3. The data association query method of claim 1, wherein determining the query policy according to the statement format comprises:
   in response to the statement format being a non-partition column format, acquiring a storage format of the data in the second association table; and
   determining the query policy according to the storage format.

4. The data association query method of claim 3, wherein determining the query policy according to the storage format comprises:
   in response to the storage format being a column-oriented storage format, determining the query policy as the scan-while-filter policy; and
   accordingly, querying the data in the second association table based on the query policy comprises:
   scanning column-oriented data in the second association table sequentially, and in response to scanning data of a current column, matching a key value of the current column with the query key information;
   in response to matching between the key value of the current column and the query key information succeeding, determining data of the current column as the target data; and
   in response to matching between the key value of the current column and the query key information failing, skipping the current column, and scanning a next column until the target data is scanned.

5. The data association query method of claim 3, wherein determining the query policy according to the storage format comprises:
   in response to the storage format being a non-column-oriented storage format, determining the query policy as the scan-before-filter policy;
   accordingly, querying the data in the second association table based on the query policy comprises:
   scanning all the data in the second association table to obtain a key value of the data; and filtering out data whose key value does not match the query key information to obtain the target data.

6. A computer device, comprising a memory, a processor, and a computer program stored on the memory and executable on the processor, wherein the processor, when executing the computer program, performs the following:

parsing a data query statement to obtain association query information; wherein the association query information comprises query key information of a first association table;

determining a query policy according to the query key information; wherein the query policy comprises a partition filtering policy, a scan-while-filter policy and a scan-before-filter policy; and querying, based on the query policy, data in a second association table to obtain target data;

wherein the processor is configured to perform determining the query policy according to the query key information by:

determining a statement format of the query key information; and determining the query policy according to the statement format;

wherein the processor is configured to perform determining the query policy according to the statement format by: in response to the statement format being a partition column format, determining the query policy as the partition filtering policy;

accordingly, the processor is configured to perform querying the data in the second association table based on the query policy of the first association table by:

filtering out partitions that do not match the query key information from the second association table; and performing a data query in remaining partitions after filtering according to the query key information.

7. A non-transitory computer-readable storage medium storing a computer program, wherein the computer program, when executed by a processor, performs the following:

parsing a data query statement to obtain association query information; wherein the association query information comprises query key information of a first association table;

determining a query policy according to the query key information; wherein the query policy comprises a partition filtering policy, a scan-while-filter policy and a scan-before-filter policy; and querying, based on the query policy, data in a second association table to obtain target data;

wherein the computer program is configured to perform determining the query policy according to the query key information by:

determining a statement format of the query key information; and determining the query policy according to the statement format;

wherein the computer program is configured to perform determining the query policy according to the statement format by: in response to the statement format being a partition column format, determining the query policy as the partition filtering policy;

accordingly, the computer program is configured to perform querying the data in the second association table based on the query policy of the first association table by:

filtering out partitions that do not match the query key information from the second association table; and performing a data query in remaining partitions after filtering according to the query key information.

8. The computer device of claim 6, wherein the processor is configured to perform parsing the data query statement to obtain the association query information by:

generating a logical plan based on statement logic of the data query statement;

extracting an association query node in the logical plan; and acquiring association query information corresponding to the association query node.

9. The computer device of claim 6, wherein the processor is configured to perform determining the query policy according to the statement format by:

in response to where the statement format being a non-partition column format, acquiring a storage format of the data in the second association table; and determining the query policy according to the storage format.

10. The computer device of claim 9, wherein the processor is configured to perform determining the query policy according to the storage format by:

in response to where the storage format being a column-oriented storage format, determining the query policy as the scan-while-filter policy; and accordingly, the processor is configured to perform querying the data in the second association table based on the query policy by:

scanning column-oriented data in the second association table sequentially, and in response to scanning data of a current column, matching a key value of the current column with the query key information;

in response to matching between the key value of the current column and the query key information succeeding, determining data of the current column as the target data; and in response to matching between the key value of the current column and the query key information failing, skipping the current column, and scanning a next column until the target data is scanned.

11. The computer device of claim 9, wherein the processor is configured to perform determining the query policy according to the storage format by:

in response to the storage format being a non-column-oriented storage format, determining the query policy as the scan-before-filter policy;

accordingly, the processor is configured to perform querying the data in the second association table based on the query policy by:

scanning all the data in the second association table to obtain a key value of the data; and filtering out data whose key value does not match the query key information to obtain the target data.

12. The non-transitory computer-readable storage medium of claim 7, wherein the computer program is configured to perform parsing the data query statement to obtain the association query information by:

generating a logical plan based on statement logic of the data query statement;

extracting an association query node in the logical plan; and acquiring association query information corresponding to the association query node.

13. The non-transitory computer-readable storage medium of claim 7, wherein the computer program is configured to perform determining the query policy according to the statement format by:

in response to the statement format being a non-partition column format, acquiring a storage format of the data in the second association table; and determining the query policy according to the storage format.

14. The non-transitory computer-readable storage medium of claim 13, wherein the computer program is configured to perform determining the query policy according to the storage format by:

in response to the storage format being a column-oriented storage format, determining the query policy as the scan-while-filter policy; and accordingly, the computer program is configured to perform querying the data in the second association table based on the query policy by:

scanning column-oriented data in the second association table sequentially, and in response to scanning data of a current column, matching a key value of the current column with the query key information;

in response to matching between the key value of the current column and the query key information succeeding, determining data of the current column as the target data; and in response to matching between the key value of the current column and the query key information failing, skipping the current column, and scanning a next column until the target data is scanned.

15. The non-transitory computer-readable storage medium of claim 13, wherein the computer program is configured to perform determining the query policy according to the storage format by:

in response to the storage format being a non-column-oriented storage format, determining the query policy as the scan-before-filter policy;

accordingly, the computer program is configured to perform querying the data in the second association table based on the query policy by:

scanning all the data in the second association table to obtain a key value of the data; and filtering out data whose key value does not match the query key information to obtain the target data.

* * * * *